3,508,327
ELECTRIC MOTOR ASSEMBLED BY METAL FORMING
Artur Diederichs, Wolfgang Pieper, and Hermann Welz, Wurzburg, Germany, assignors to Siemens Aktiengesellschaft, a corporation of Germany
Continuation of application Ser. No. 567,174, July 22, 1966. This application Apr. 30, 1969, Ser. No. 820,685
Claims priority, application Germany, July 24, 1965, S 98,407
Int. Cl. H02k 15/00
U.S. Cl. 29—596
11 Claims

ABSTRACT OF THE DISCLOSURE

Method of producing an electric motor in which two bearing shields are located on axially opposite sides of a ring-shaped stator and having respective bearings in which there are journalled a shaft carrying a rotor coaxially surrounded by the stator includes the steps of assembling the bearing shields, having their peripheral surface in rough condition, with the shaft and rotor and with the stator within a tubular housing which surrounds the stator and bearing shields with clearance, placing the two bearing shields in axially spaced relation from the stator along the entire periphery, subjecting the entire assembly to high-speed metal forming and thereby compressively deforming said tubular housing peripherally toward and around the stator and also peripherally toward and around each of the two bearing shields so as to rigidly attach the housing to the bearing shields and the stator.

---

This application is a continuation of Ser. No. 567,174, filed July 22, 1966, now abandoned.

Our invention relates to an electric motor assembled by high-speed metal forming, preferably magnetic-pulse forming.

The term "high-speed metal forming" relates to metal-working processes in which a permanent deformation and change in shape of metallic workpieces is effected at greatly higher speeds than with conventional machining or other fabricating methods. Aside from the magnetic-pulse forming method, there are available the so-called hydro-spark (hydro-electric) method and the explosion-forming method, the latter operating by igniting an explosive charge to produce the required forming pressure. A particular advantage of assembling by high-speed metal forming is the fact that the individual components to be assembled need not be given accurately matching fits.

When assembling an electric motor by high-speed metal forming, this method is preferably carried out by preliminarily assembling and aligning the coarsely prefabricated individual parts and/or subassemblies with the aid of a jig or the like, placing the assemblage of components into the metal-forming device and then joining them together by the effect of the metal-forming forces. In this manner, an electric motor can be completed, so as to have its individual components permanently joined with each other, in a single stage of high-speed forming operation.

It is an object of our invention to devise an electric motor which greatly facilitates being thus assembled and completed by high-speed metal forming, particularly magnetic-pulse forming.

To this end and according to the invention, the bearing shields of the motor are prefabricated without any subsequent machining or finishing of their seating faces and are placed together with the active stator component of the motor, but without touching the latter, into a cylindrical or tubular housing; and the entire assemblage of components is thereafter rigidly joined to a single unit by subjecting the tubular housing to the high-speed metal-forming operation.

The invention, therefore affords the possibility, and comprises as one of its further features, that the bearing shields may consist of simple disc-shaped punchings which need not be subsequently machined. Also applicable to advantage are bearing shields of metal or synthetic materials produced by injection molding or casting.

Preferably the bearings for the motor shaft are fastened in the respective bearing shields before assembling the motor components in the above-described manner. A particular advantage is the fact that the invention permits using not only spherical and calotte-type bearings but also cylindrical glide bearings which, for example, may simply be riveted into the respective bearing shields. This is made possible by virtue of the fact that during assembling and metal forming, the bearing shields are not in contact with the active stator portion. It is only necessary that prior to subjecting the assembled components to the metal-forming operation the bearings be seated upon the shaft without edging. Such seating is secured, for example, by coating the shaft at the bearing locations prior to the metal-forming operation with a thin layer of a liquid or solid medium, the layer thickness corresponding to the bearing clearance. Preferably employed for this purpose are lubricants. It has been found that angular departures of the bearing shield from a plane accurately normal to the axis of the motor shaft are inessential. Consequently, no particular care is required with respect to a precisely oriented fastening of the bearings in the bearing shield.

For increasing the useful life of the bearings, it is preferable to provide the bearing shields with storage chambers for lubricants which may be filled with grease or oil-impregnated felt or the like.

As a rule, electric motors are to be equipped with angular structures, flanges, bolts, swing arms, feet or other fastening means. It is of advantage to fasten such additional components simultaneously with, and due to the effect of, the high-speed metal-forming operation that completes the assembling work and joins the main components of the motor to a rigid structure.

The invention will be further described by way of example with reference to embodiments illustrated on the accompanying drawings, in which—

The same reference numerals are applied in all of the illustrations for functionally similar elements respectively.

Figure 1:
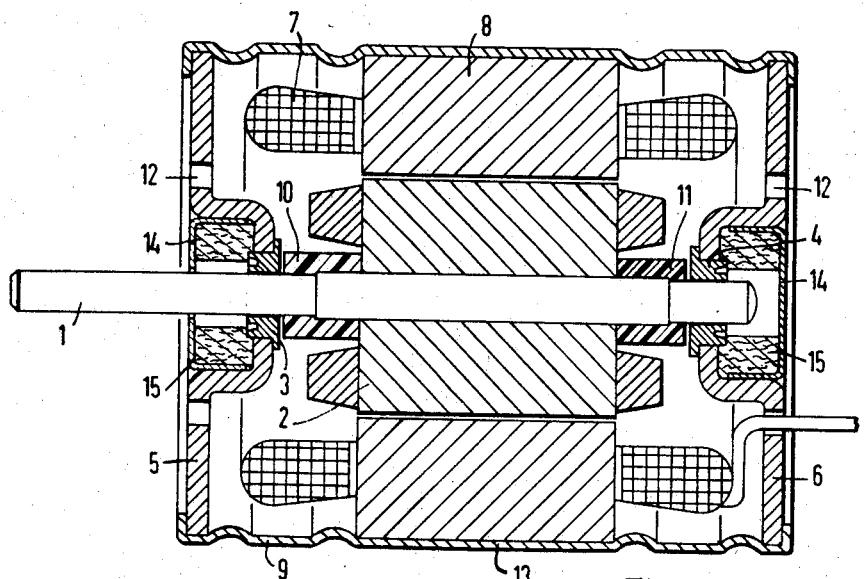
FIG. 1 is an axial section through a motor according to the invention.

Referring to FIG. 1, there is shown a motor shaft 1 which carries the rotor 2. The illustrated machine is an alternating-current induction motor, the rotor 2 being of the squirrel-cage type. The shaft 1 is journalled in two axially spaced bearings 3 and 4, each consisting of a cylindrical body made of sintered metal and peripherally riveted into a central opening of a generally disc-shaped bearing shield 5 or 6. The stack 8 of stator lamination, which carries the field winding 7, surrounds the rotor 2 in coaxial relation to the shaft 1 and is fastened in a tubular housing 9. The bearing shields 5 and 6 are fastened in the same tubular housing. The rigid junction between the housing on the one hand and the stator stack 8 and the bearing shields 5 and 6, on the other hand, is effected by deformation of the housing caused by the peripherally uniform compressive force resulting from the magnetic-pulse forming method or other high-speed metal-forming method employed.

As will be seen from FIG. 1, the bearing shields 5 and 6 are connected with the stator lamination stack 8 only through the tubular housing 9. This has considerable advantages with respect to the assembling of the motor. For example, the individual components of the motor may be placed into the metal forming equipment in the following manner. First, the bearing shield 5 is inserted. Then the shaft 1 with the laminated rotor 2 is inserted together with a spacer sleeve 10 of non-magnetic material. Another spacer sleeve 11 of non-magnetic material is then stuck upon the shaft 1. Thereafter, the stator stack 8 is placed around the rotor 2, and the second bearing shield 6 with the bearing 4 is stuck upon the shaft 1. Up to this stage the bearing shields 5 and 6 with the respective bearings 3 and 4 are centered exclusively by means of the shaft 1. For this purpose the bearing locations of the shaft are preferably given a coating of lubricant having a thickness corresponding to that of the clearance in the bearings. The stator 8 is centered with the aid of the rotor 2, for example by inserting air-gap needles in the conventional manner into the gap between rotor and stator. For this purpose, the bearing shields 5 and 6 are provided with openings 12 for the passage of the needles.

When the centering of the component parts is completed, a straight cylindrical tube 13 of good conducting material, for example aluminum or copper, is shoved over the bearing shields and the stator 8, although, if desired, the tube 13 may also be placed into the magnetic-forming equipment at an earlier stage.

In the above-mentioned metal-forming equipment, the tube 13 is coaxially surrounded by a work coil, a field concentrator being preferably interposed peripherally between the coil and the localities where the major amount of compression and radially inward deformation of the tube 13 is to take place. These localities correspond to the diametrically constricted four areas along the length of the tube 13 apparent from FIG. 1. The above-mentioned magnetic pulse-forming equipment is not illustrated since it is known as such. Reference may be had, for example, to U.S. Patent 2,976,907 and to the article "Magnetic-Pulse Forming" by D. F. Brower, published as Paper No. 479B by the Society of Automotive Engineers, Inc., 485 Lexington Ave., New York 17, N.Y. (particularly FIG. 3).

By virtue of the permanent deformation thus imparted to the originally straight cylindrical tube 13, the peripheral indentations are formed and the tube, previously seated loosely about the stator 8 and bearing shields 5 and 6, is rigidly joined with the shields and the stator. Due to the high speed of the metal-forming process, the components previously centered with respect to the shaft 1 and the rotor 2 retain the centered position upon completion of the forming operation.

In the embodiment according to FIG. 1, the bearing shields 5 and 6 have a cup-shaped middle portion closed by a removable cup-shaped cover 14 thus forming a lubricant storage space 15 to be filled with grease or oil-impregnated felt.

Figure 2:
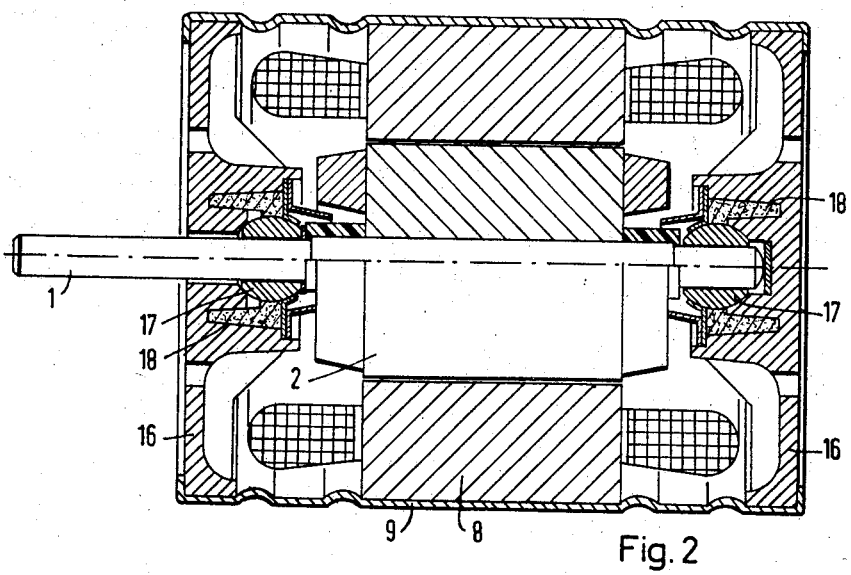
FIG. 2 is an axial section through a modified embodiment of such a motor.

The embodiment illustrated in FIG. 2 is largely similar to that described above with reference to FIG. 1. However, in lieu of the punched bearing shields of FIG. 1, the motor according to FIG. 2 has bearing shields 16 produced by injection molding or pressure casting. Rotatably mounted in the bearing shields are respective calotte-type bearings 17 which are capable of universal motion on their respective spherical seats. Formed about each calotte bearing is an annular recess 18 covered toward the interior of the motor so as to form a storage space for grease or other lubricant. The bearing shields 16 and the annular stack 8 of the stator laminations are mounted in the housing and are joined with the housing and the other components by high-speed metal forming in the manner as described above.

Figure 3:
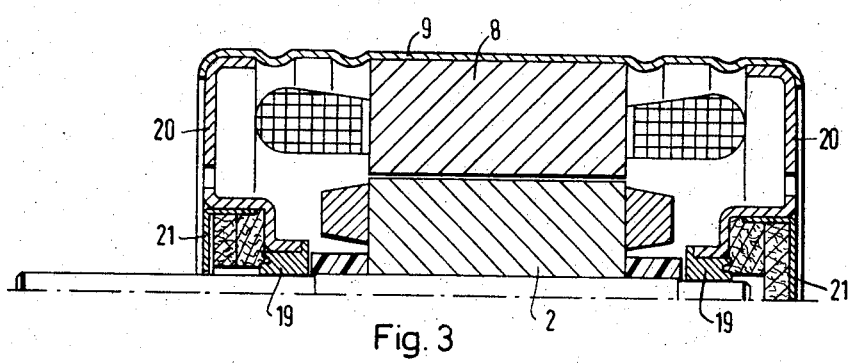
FIG. 3 is a partial and likewise sectional view of still another embodiment.

In the embodiment of FIG. 3, the bearing shields are composed of punched parts into which the cylindrical bearings 19 are riveted. The bearing shields 20 have a cup-shaped center portion to provide for lubricant storage space closed by an annular cover 21. As shown in FIG. 3, the peripheral edges of the bearing shields 20 are bent inwardly to form a flange, thus providing for a correspondingly larger peripheral contact area engaged by the tubular housing 9.

Figure 4:
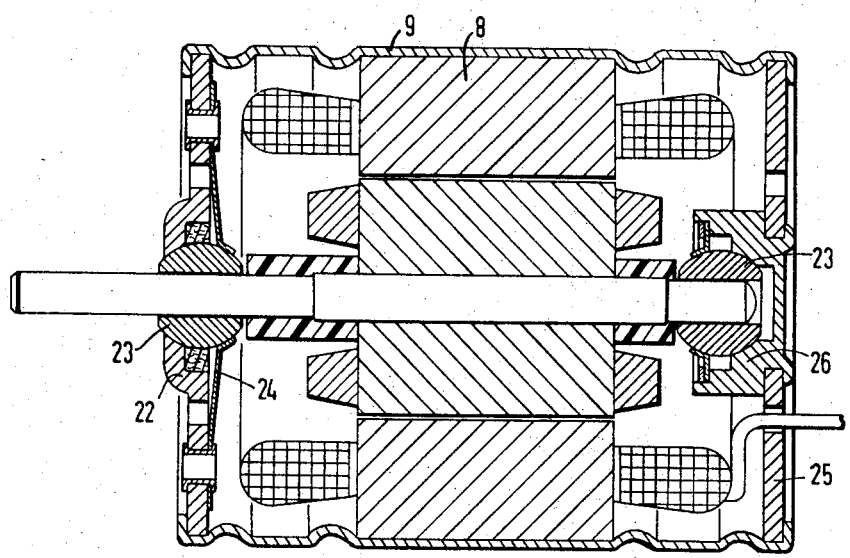
FIGS. 4 through 8 illustrate five (additionally) different motors, all in accordance with the invention.

The motor illustrated in FIG. 4 comprises a bearing shield 22 produced as a punched part. A calotte-type bearing 23 is fastened in the bearing shield with the aid of springs 24 in known manner. The calotte bearing 23 of the other bearing shield 25 is not directly attached thereto but is fastened to an inserted component 26 peripherally riveted to the bearing shield 25.

Figure 5:
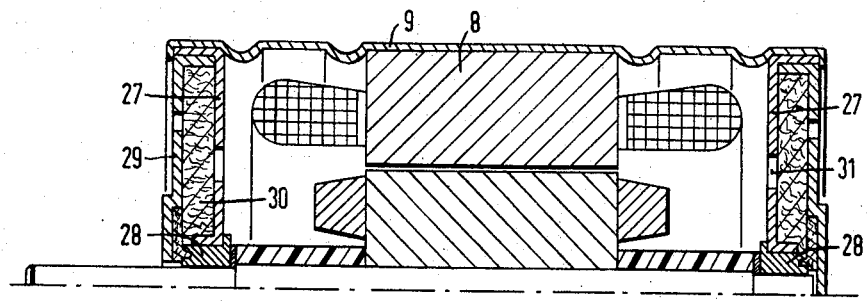

FIG. 5 shows an embodiment in which cylindrical bearings 28 are riveted into the respective inner portions 27 of the bearing shields. The outer portion 29 of each bearing shield leaves a large interspace 30 to serve as storage chamber for lubricant. During the above-described assembling stage, the air gap between the rotor and the ring-shaped stator is accessible for air-gap needles through openings 31 in the respective shields 27.

Figure 6:
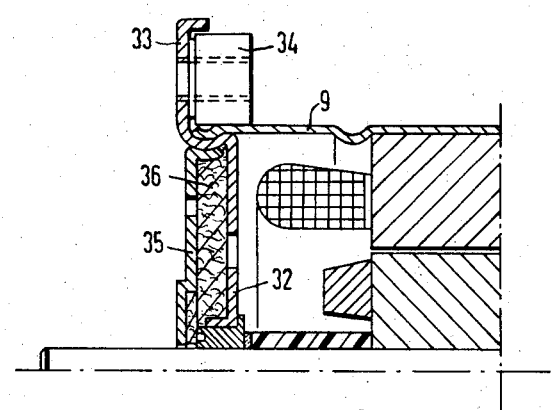

FIG. 6 illustrates a modified embodiment in which a portion 32 of the bearing shield has an integral extension 33 serving to hold a nut 34 for fastening the motor. The nut 34 is attached after the metal-forming stage is completed. Denoted by 35 is a cover, fastened by snap action, which closes a grease storage chamber 36.

Figure 7:
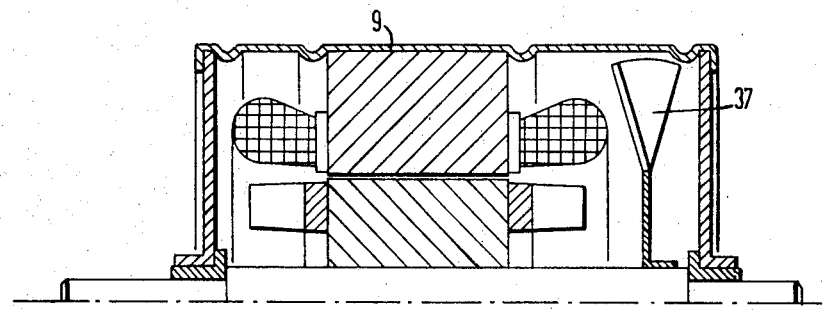
Figure 8:
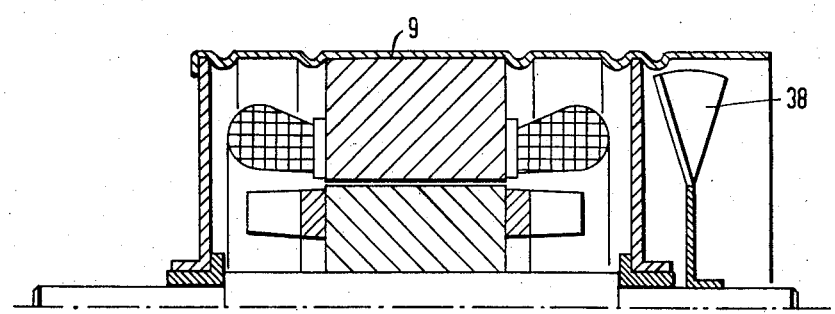

FIGS. 7 and 8 show embodiments similar to those described in the foregoing but additionally equipped with an internal fan 37 (FIG. 7) and an external fan 38 (FIG. 8). In both cases, the design of the motor is essentially the same as that of those already described. It will be seen that the invention affords applying the above-described high-speed metal forming process also for the production of forced-ventilation motors.

It will be understood that the components, which in a motor are rigidly joined with the tubular housing 9, need not be machined or given a precise finish at the surface areas engaged by and rigidly fastened to the housing. The outer peripheral surface of the stack 8 of stator laminations may rather be left in a relatively rough condition, and the same applied to the peripheral areas of the bearing shields. This is due to the fact that during the assembling stage the tubular housing is peripherally spaced from the stator and the bearing shields, the clearance being, however, completely and forcefully eliminated by the peripherally active shock forces subsequently imposed upon the housing by the pulsed magnetic field or other abruptly or explosively acting forming pulses.

To those skilled in the art it will be obvious from a study of this disclosure that our invention permits of various modifications and may be given embodiments other than particularly illustrated and described herein, without departing from the essential features of the invention and within the scope of the claims annexed hereto.

We claim:

1. The method of producing an electric motor in which two bearing shields are located on axially opposite sides of a ring-shaped stator and having respective bearings in which there are journalled a shaft carrying a rotor coaxially surrounded by the stator, which method comprises the steps of assembling the bearing shields, having their peripheral surface in rough condition, with the shaft and rotor and with the stator within a tubular housing which surrounds the stator and bearing shields with clearance, placing the two bearing shields in axially spaced relation from the stator along the entire periphery, subjecting the entire assembly to a single stage high-speed metal forming process compressively deforming by shock forces said tubular housing peripherally toward and around the stator and also peripherally toward and around each of the two bearing shields simultaneously so as to rigidly attach the housing to the bearing shields and the stator.

2. In a method according to claim 1, said bearing shields consisting substantially of disc-shaped punchings.

3. In a method according to claim 1, said bearing shields consisting of castings.

4. In a method according to claim 1, said bearing shields consisting of synthetic insulating material.

5. In a method according to claim 1, each of said bearings forming a coaxial peripheral rivet joining said bearing with its bearing shield.

6. In a method according to claim 1, each of said bearing shields comprising a lubricant storage chamber in communication with said bearing of said shield.

7. In a method according to claim 1, each of said bearing shields having a substantially planar main portion extending in a diametrical plane relative to said shaft and having a peripheral rim portion extending at a substantially right angle away from said main portion so as to have a peripheral surface area whose axial width is larger than the axial thickness of said main portion, said housing forming a deformation bond with said entire peripheral surface area of said rim portion.

8. In a method according to claim 7, each of said bearing shields having a cup-shaped cover coaxially engaging said peripheral rim portion and forming a lubricant storage chamber between said cover portion and said main portion, said storage chamber being in communication with said bearing.

9. The method according to claim 1, which comprises placing a film of lubricant between the shaft and the bearings prior to metal forming.

10. The method according to claim 1, which comprises placing a film of lubricant between the bearings and the respective shields prior to metal forming.

11. The method according to claim 1, which comprises attaching fastening means to the motor by inserting said means into said tubular housing prior to subjecting the assemblage to said high-speed metal forming, and rigidly joining said means with said housing by the subsequent metal-forming operation.

References Cited

UNITED STATES PATENTS

| | | | |
|---|---|---|---|
| 2,907,904 | 10/1959 | Carpenter | 310—42 |
| 3,081,411 | 3/1963 | Wiley | 310—42 |
| 1,497,734 | 6/1924 | Ramoneda | 29—596 |
| 2,295,203 | 9/1942 | Darnell | 310—217 |
| 3,214,511 | 10/1965 | Franklin | 29—421 |

JOHN F. CAMPBELL, Primary Examiner

C. E. HALL, Assistant Examiner

U.S. Cl. X.R.

29—421; 310—42